US010730132B2

(12) United States Patent
Hsu et al.

(10) Patent No.: US 10,730,132 B2
(45) Date of Patent: Aug. 4, 2020

(54) RECIPROCATING WIRE FEED WELDING SYSTEM AND METHOD

(71) Applicant: ILLINOIS TOOL WORKS INC., Glenview, IL (US)

(72) Inventors: Christopher Hsu, Mentor, OH (US); Dennis Roland Sigl, Greenville, WI (US); Herbert Alexius Bankstahl, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 524 days.

(21) Appl. No.: 15/380,960

(22) Filed: Dec. 15, 2016

(65) Prior Publication Data

US 2017/0182580 A1 Jun. 29, 2017

Related U.S. Application Data

(60) Provisional application No. 62/271,983, filed on Dec. 28, 2015.

(51) Int. Cl.
*B23K 9/12* (2006.01)
*B65H 51/32* (2006.01)
*B23K 9/133* (2006.01)
*B65H 51/10* (2006.01)

(52) U.S. Cl.
CPC .............. *B23K 9/125* (2013.01); *B23K 9/124* (2013.01); *B23K 9/133* (2013.01); *B23K 9/1336* (2013.01); *B65H 51/10* (2013.01); *B65H 51/32* (2013.01); *B65H 2701/36* (2013.01)

(58) Field of Classification Search
None
See application file for complete search history.

(56) References Cited

U.S. PATENT DOCUMENTS

| | | | |
|---|---|---|---|
| 1,873,326 A | 8/1932 | Ratigan | |
| 3,055,591 A | 9/1962 | Shepard | |
| 3,062,569 A | 11/1962 | Westermeier | |
| 3,199,644 A | 8/1965 | Clapp | |
| 3,203,268 A | 8/1965 | Manoni | |
| 3,265,268 A * | 8/1966 | Bach | B21F 27/10 226/112 |
| 3,734,369 A | 5/1973 | Johnson | |

(Continued)

FOREIGN PATENT DOCUMENTS

| | | |
|---|---|---|
| CN | 201881037 | 6/2011 |
| CN | 202963749 | 6/2013 |

(Continued)

OTHER PUBLICATIONS

International Search Report from PCT application No. PCT/US2016/067819, dated Apr. 11, 2017, 16 pgs.

*Primary Examiner* — Ibrahime A Abraham
*Assistant Examiner* — Elizabeth M Sims
(74) *Attorney, Agent, or Firm* — McAndrews, Held & Malloy, Ltd.

(57) ABSTRACT

A consumable filler metal delivery system includes a reciprocating wire feeding gear assembly configured to move a wire forward and backward with a net forward motion and a motor configured to drive the reciprocating wire feeding gear assembly, wherein the motor is configured to rotate only in one direction during operation of the consumable filler metal delivery system.

29 Claims, 8 Drawing Sheets

(56) References Cited

U.S. PATENT DOCUMENTS

| | | | |
|---|---|---|---|
| 4,527,037 A | 7/1985 | Johnson | |
| 4,703,156 A | 10/1987 | Hayes | |
| 4,902,162 A | 2/1990 | Watt | |
| 4,954,690 A | 9/1990 | Kensrue | |
| 5,249,760 A | 10/1993 | Morimoto | |
| 5,410,126 A | 4/1995 | Miller | |
| 5,816,466 A | 10/1998 | Seufer | |
| 6,286,748 B1 | 9/2001 | Cooper | |
| 6,356,644 B1 | 3/2002 | Pollak | |
| 6,388,234 B1 | 5/2002 | Collins | |
| 6,427,894 B1 | 8/2002 | Blank | |
| 6,536,644 B2 | 3/2003 | Plow | |
| 6,557,742 B1 | 5/2003 | Bobeczko | |
| 6,568,578 B1 | 5/2003 | Kensrue | |
| 6,963,048 B2 | 11/2005 | Huismann | |
| 6,969,823 B2 | 11/2005 | Huismann | |
| 6,984,806 B2 | 1/2006 | Huismann | |
| 7,165,707 B2 | 1/2007 | Huismann | |
| 7,244,909 B2 | 7/2007 | Kensrue | |
| 7,301,124 B2 | 11/2007 | Kaufman | |
| 7,374,074 B2 | 5/2008 | Matiash | |
| 7,615,723 B2 | 11/2009 | Matiash | |
| 7,767,934 B2 | 8/2010 | Christopher | |
| 7,977,604 B2 | 7/2011 | Ertmer | |
| 8,569,653 B2 * | 10/2013 | Enyedy | B23K 9/1336 219/136 |
| 2002/0130153 A1 | 9/2002 | Plow | |
| 2003/0015510 A1 | 1/2003 | Wakeman | |
| 2005/0006425 A1 | 1/2005 | Enyedy | |
| 2005/0016976 A1 | 1/2005 | Belfiore | |
| 2005/0040202 A1 | 2/2005 | Kerekes | |
| 2005/0224486 A1 | 10/2005 | Matiash | |
| 2006/0219683 A1 | 10/2006 | Kensrue | |
| 2006/0278623 A1 | 12/2006 | Christopher | |
| 2008/0035624 A1 | 2/2008 | Ertmer | |
| 2008/0257874 A1 | 10/2008 | Kaufman | |
| 2009/0090427 A1 | 4/2009 | Yun | |
| 2009/0277890 A1 | 11/2009 | Leiteritz | |
| 2010/0314373 A1 | 12/2010 | Kaufman | |
| 2011/0220628 A1 | 9/2011 | Mehn | |
| 2012/0152924 A1 | 6/2012 | Christopher | |
| 2012/0152926 A1 | 6/2012 | Matiash | |
| 2012/0248084 A1 | 10/2012 | Romenesko | |
| 2013/0035192 A1 | 2/2013 | Hayashi | |
| 2013/0334190 A1 | 12/2013 | Garvey | |
| 2015/0014383 A1 * | 1/2015 | Patterson | B65H 51/32 226/181 |

FOREIGN PATENT DOCUMENTS

| | | |
|---|---|---|
| DE | 20113852 | 11/2001 |
| EP | 1577245 | 9/2005 |
| EP | 2476500 | 7/2012 |
| GB | 1093736 | 12/1967 |
| WO | 0128728 A2 | 4/2001 |
| WO | 03022501 | 1/2003 |
| WO | 2008018960 | 2/2008 |
| WO | 2008018961 | 2/2008 |
| WO | 2013033849 | 3/2013 |

* cited by examiner

RECIPROCATING WIRE FEED WELDING SYSTEM AND METHOD

CROSS-REFERENCE TO RELATED APPLICATION

This application claims priority to and benefit of U.S. Provisional Patent Application No. 62/271,983, entitled "RECIPROCATING WIRE FEED WELDING SYSTEM AND METHOD," filed Dec. 28, 2015, which is herein incorporated by reference in its entirety.

BACKGROUND

The present disclosure relates generally to welding systems, and more particularly to a reciprocating wire feed system configured to enable controlled short circuits between a welding wire and an advancing weld.

A wide range of welding systems and welding control regimes have been implemented for various purposes. In continuous welding processes with consumable electrode, gas metal arc welding (GMAW), and more specifically, metal inert gas (MIG) or metal active gas (MAG) techniques (collectively called GMAW) allow for formation of a continuing weld bead by feeding welding wire electrode shielded by gas (typically an inert gas or gas containing inert agents or active gas such as $CO_2$ or oxygen) from a welding torch. One variation of GMAW is Flux Cored Arc Welding (FCAW) with a consumable electrode containing flux in the core surrounded by metal sheath. In such applications, the welding can be done with or without shielding gas. Another welding process is submerged arc welding (SAW), or sub-arc for short, where shielding is accomplished by solid powder flux instead of gas, and the arc is buried under the flux bed. Another welding process decouples wire feed from the heat source, where the heat source may be laser, electron beam, plasma or TIG, and the wire (e.g., consumable electrode) may be cold or "hot" (e.g., pre-heated) before entering (e.g., being deposited) into the melted puddle on the workpiece created by the heat source. Electrical power is applied to the welding wire and a circuit is completed through the workpiece to sustain an arc that melts the wire and the workpiece to form the desired weld.

Advanced forms of welding with consumable electrode can be based upon controlled short circuits between the wire electrode and the advancing weld puddle formed from melted metal of the workpieces and the wire electrode. One method of controlling short circuit behavior is welding current reduction during short-to-arc and arc-to-short transitions via current regulation or a secondary switch in the welding power supply.

In other applications, the controlled short circuits may be created by a reciprocating wire feed system configured to oscillating the welding wire in and out of the advancing weld puddle. By oscillating the wire in and out of the weld puddle, liquid at the end of the welding wire may be dipped into the puddle mechanically and detached form the welding wire when the wire is pulled out of the puddle, thereby accomplishing a "controlled short circuit" effect. Typically, mechanical motion of the wire is slow. To achieve desired higher deposition and faster welding travel speed, the wire must move bi-directionally in excess of 1000 inches per minute and at a rate in excess of 100 Hz at 100% duty cycle. Traditional reciprocating wire feed systems use a bi-directional motor, and bi-directional motors typically have high torque requirements to overcome the inertia of the motor, the drive rolls and/or gears. Bi-directional motors may have limitations on the reciprocating frequency (which in turn imposes limitation on wire feed and travel speeds and productivity), and may be susceptible to overheating, and/or may be oversized, which may cause weld joint accessibility issues.

BRIEF DESCRIPTION

In one embodiment, a reciprocating welding wire feed system includes a first drive roll comprising a first set of protrusions extending radially outward from the first drive roll and configured to drive a welding wire in a first linear direction and a second drive roll disposed adjacent to the first drive roll, wherein the second drive roll comprises a second set of protrusions extending radially outward from the second drive roll and configured to drive the welding wire in a second linear direction opposite the first direction, wherein the first drive roll and the second drive rolls do not contact the welding wire simultaneously.

In another embodiment, a reciprocating welding wire feed system includes a first drive roll configured to contact a welding wire, a second drive roll disposed adjacent to the first drive roll on a same side of the welding wire, wherein the second drive roll is configured to contact the welding wire, a first expandable roll disposed opposite the first drive roll relative to the welding wire, and a second expandable roll disposed opposite the second drive roll relative to the welding wire, wherein the first expandable roll is configured to expand radially upon application of an electrical signal to the first expandable roll, and the second expandable roll is configured to expand radially upon application of the electrical signal to the second expandable roll.

In a further embodiment, a method includes driving rotation of a gear of a reciprocating welding wire feed system with a motor rotating in only one rotational direction, feeding a welding wire through the reciprocating welding wire feed system in a first linear direction by driving the gear in the one rotational direction, and retracting the welding wire through the reciprocating welding wire feed system in a second linear direction opposite the first linear direction by driving the gear in the one rotational direction.

In another embodiment, a consumable filler metal delivery system includes a reciprocating wire feeding gear assembly configured to move a wire forward and backward with a net forward motion and a motor configured to drive the reciprocating wire feeding gear assembly, wherein the motor is configured to rotate only in one direction during operation of the consumable filler metal delivery system.

DRAWINGS

DETAILED DESCRIPTION

Figure 1:
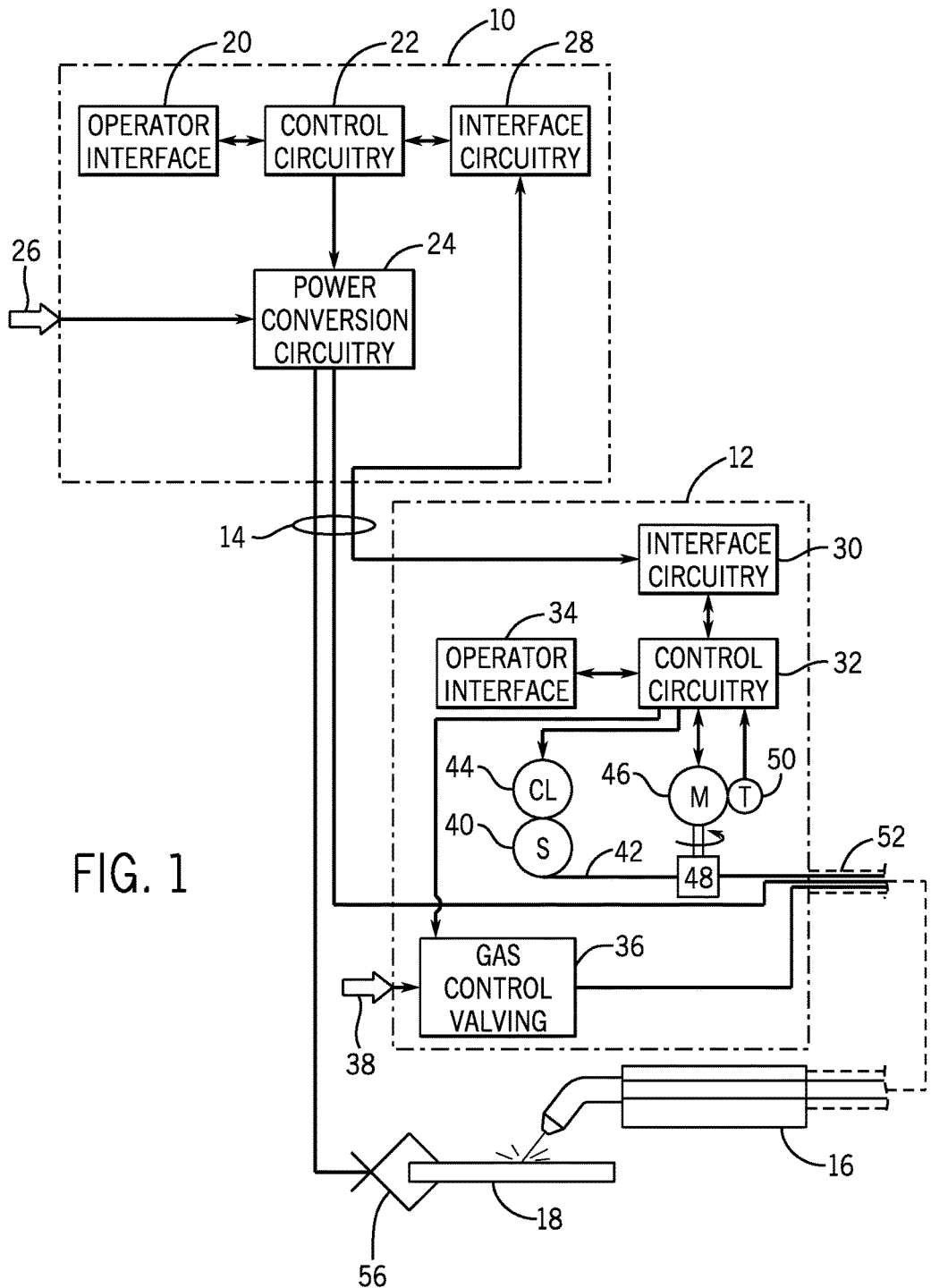
FIG. 1 is a diagrammatical representation of a welding system having a reciprocating wire feed system, in accordance with an embodiment of the present disclosure.

Embodiments of the present disclosure are directed toward a reciprocating wire feed system for a welding system. More specifically, the disclosed embodiments include reciprocating wire feed systems configured to be driven by a motor that rotates in one direction during operation while moving or driving a wire linearly with rapid changes of direction (e.g., forward and backward). For example, in one embodiment, the reciprocating wire feed system includes a toothed drive roll system that is driven by a motor rotating in only one direction and enables a reciprocating or oscillating motion of a welding wire. In another embodiment, the reciprocating wire feed system includes an expanding and contracting drive roll system that is driven by a motor rotating in only one direction and enables a reciprocating or oscillating motion of a welding wire. In a further embodiment, the reciprocating wire feed system includes a planetary gear assembly that is driven by a motor rotating in only one direction and enables a reciprocating or oscillating motion of a welding wire. Each of these embodiments are discussed in further detail below.

As will be appreciated, the disclosed embodiments provide improvements over traditional reciprocating wire feed systems (e.g., systems that utilize bi-directional motors). For example, the disclosed reciprocating wire feed systems utilize a motor rotating in only one direction that may be cheaper, smaller, lighter in weight, less susceptible to overheating, may use less torque than bi-directional motors, and may enable a change of wire direction at higher frequencies. Additionally, the disclosed embodiments may be used in existing welding wire drive systems with increased inertia to reverse wire direction. In other words, existing welding wire feed systems may be retrofitted to include the disclosed reciprocating wire feed systems. The disclosed embodiments may also enable improvement in arc starting, reduction in spatter during a welding operation, higher travel speeds, weld grain refinement, higher ductility, and other improvements to the welding operation. While the present disclosure describes embodiments in a welding system context, the present techniques may also be used in other processes, such as cladding or brazing, that also use consumable electrodes (e.g., filler metals). For example, the disclosed systems may be used to perform gas metal arc welding, flux-cored arc welding, submerged arc welding, tungsten inert gas welding with hot wire/cold wire, laser welding, plasma welding, cladding, brazing process, a multi-wire process, or any combination thereof.

It should be noted that the term "wire feeder" used herein includes any system (e.g., mechanism) configured to feed a wire. For example, the wire feeder may be a standalone system or a component of another system. In one implementation, the wire feeder (e.g., wire feeding mechanism) may be a part (e.g., an integral component of a welding torch. As such, the wire feeder may only be a few feet away from a contact tip (e.g., 3-5 feet) of the torch. In another embodiment, the wire feeder is a separately packaged object that the welding torch plugs into. For example, the wire feeder may be physically mounted on a robot arm.

Turning now to the drawings, and referring first to FIG. 1, an exemplary welding system is illustrated as including a power supply 10 and a wire feeder 12 coupled to one another via conductors or conduits 14. For example, the welding system may be an automated welding system that is automated robotically. In the illustrated embodiment, the power supply 10 is separate from the wire feeder 12, such that the wire feeder 12 may be positioned at some distance from the power supply 10 near a welding location. However, it should be understood that the wire feeder 12, in some implementations, may be integral with the power supply 10. In such cases, the conduits 14, except for the ground conduit, would be internal to the system. In embodiments in which the wire feeder 12 is separate from the power supply 10, terminals are typically provided on the power supply 10 and on the wire feeder 12 to allow the conductors or conduits 14 to be coupled to the systems so as to allow for power and gas to be provided to the wire feeder 12 from the power supply 10, and to allow data to be exchanged between the two devices.

The system is designed to provide wire, power and shielding gas to a welding torch 16. As will be appreciated by those skilled in the art, the welding torch 16 may be of many different types, and typically allows for the feed of a welding wire and gas to a location adjacent to a workpiece 18 where a weld is to be formed to join two or more pieces of metal. A second conductor 14 is typically run to the welding workpiece 18 so as to complete an electrical circuit between the power supply 10 and the workpiece 18.

The system is designed to allow for weld parameter settings to be selected by the operator, particularly via an operator interface 20 provided on the power supply 10. The operator interface 20 will typically be incorporated into a front faceplate of the power supply 10, and may allow for selection of settings such as the weld process, the type of wire to be used, voltage and current settings, and so forth. In particular, the system is designed to allow for welding with consumable electrode, such as various steels, aluminums, or other welding wire that is channeled through the torch. These weld settings are communicated to control circuitry 22 within the power supply 10. The system may be particularly adapted to implement welding regimes designed for certain electrode types.

The control circuitry 22 operates to control generation of welding power output that is applied to the welding wire for carrying out the desired welding operation. The control circuitry 22 is coupled to power conversion circuitry 24. This power conversion circuitry 24 is adapted to create the output power applied to the welding wire at the torch 16. Various power conversion circuits may be employed, including a boost converter, a buck converter, inverters, phase controlled transformer-rectifier circuits, and so forth. The configuration of such circuitry 24 may be of types generally known in the art in and of itself. The power conversion circuitry 24 is coupled to a source of electrical power as indicated by arrow 26. The power 26 applied to the power conversion circuitry 24 may originate in the power grid, although other sources of power may also be used, such as power generated by an engine-driven generator, batteries, fuel cells or other alternative sources. Finally, the power supply 10 illustrated in FIG. 1 includes interface circuitry 28 designed to allow the control circuitry 22 to exchange signals with the wire feeder 12.

The wire feeder 12 includes complementary interface circuitry 30 that is coupled to the interface circuitry 28. In some embodiments, multi-pin interfaces may be provided on both components and a multi-conductor cable run between the interface circuitries 28, 30 to allow for such information as wire feed speeds, processes, selected currents, voltages or power levels, and so forth to be set on either the power supply 10, the wire feeder 12, or both.

The wire feeder 12 also includes control circuitry 32 coupled to the interface circuitry 30. The control circuitry 32 allows for wire feed speeds to be controlled in accordance with operator selections, and permits these settings to be fed back to the power supply 10 via the interface circuitry 30. The control circuitry 32 is coupled to an operator interface 34 on the wire feeder 12 that allows selection of one or more welding parameters, particularly wire feed speed. The operator interface 34 may also allow for selection of such weld parameters as the process, the type of wire utilized, current, voltage or power settings, and so forth. The control circuitry 32 is also coupled to gas control valving 36 which regulates the flow of shielding gas to the torch 16. In general, such gas is provided at the time of welding, and may be turned on immediately preceding the weld and for a short time following the weld. The gas applied to the gas control valving 36 is often provided in the form of pressurized bottles, as represented by reference numeral 38. In certain embodiments, the gas may be 100% $CO_2$ shielding gas.

The wire feeder 12 includes components for feeding wire to the welding torch 16 and thereby to the welding application, under the control of control circuitry 32. For example, one or more supplies (e.g., spool, box, etc.) of welding wire 42 are housed in the wire feeder 12. Welding wire 42 is fed from the wire supply 40 and is progressively fed to the torch 16. The wire supply 40 may be associated with a clutch 44 that disengages the wire supply 40 when wire 42 is to be fed to the torch 16. The clutch 44 may also be regulated to maintain a minimum friction level to avoid free spinning of the wire supply 40. A feed motor 46 is provided that engages with a reciprocating wire feed system 48 to push wire 42 from the wire feeder 12 towards the workpiece 18. In particular, the reciprocating wire feed system 48 is configured to move the wire 42 toward and away (e.g., two steps forward, one step backward for a net one step forward) from the welding torch 16 (and thus the workpiece 18) to enable a "controlled short circuit" operation of the torch 16. For example, a component (e.g., a roller) of the reciprocating wire feed system 48 may be mechanically coupled to the motor 46 and may be rotated by the motor 46 to reciprocate and drive the wire 42 from the wire feeder 12. Details of the reciprocating wire feed system 48 are discussed in detail below. Finally, a tachometer or encoder or resolver 50 may be provided for detecting the speed of the motor 46, a drive roll driven by the motor 46, or other component of the reciprocating wire feed system 48 so as to provide an indication of the actual wire 42 feed speed. Signals from the tachometer 50 are fed back to the control circuitry 32, such as for closed loop feedback control or feedforward control. As described below, the system 48 may have drive rolls spinning in opposite directions. Accordingly, a logic "or" circuit may be used combine encoder A/B outputs of a forward drive roll and a rearward drive roll to produce combined pulse trains to encode actual wire 42 speed. It is also possible to use an idler roll that is propelled by the wire 42 motion as a wire speed sensor.

It should be noted that other system arrangements and input schemes may also be implemented. For example, the welding wire 42 may be fed from a bulk storage container (e.g., a drum) or from one or more spools outside of the wire feeder 12. Similarly, the wire 42 may be fed from a "spool gun" in which a spool is mounted on or near the welding torch 16. As noted herein, the wire 42 feed speed settings may be input via the operator input 34 on the wire feeder 12 or on the operator interface 20 of the power supply 10, or both. Additionally, while the illustrated embodiment shows the reciprocating wire feed system 48 integrated with the wire feeder 12, in other embodiments the reciprocating wire feed system 48 may be integrated with other another component (e.g., the welding torch 16) or may be a stand-alone (e.g., modular) system.

Power from the power supply 10 is applied to the wire electrode, typically by means of a composite cable 52 (or separate cables) in a conventional manner for wire, gas, and welding current/power. Similarly, shielding gas is fed through the wire feeder 12 and the composite cable 52. During welding operations, the wire 42 is advanced through the composite cable 52 towards the torch 16. Upon receiving command from a weld sequence controller (e.g., inside the control circuitry 22 inside power source 10), gas flow is begun, wire 42 is advanced, power is applied to the welding cable 52 and through the torch 16 to the advancing welding wire 42. Finally, a workpiece ground cable and clamp 56 allow for closing an electrical circuit from the power supply 10 through the welding torch 16, the electrode (wire 42), the arc, and the workpiece 18 back to the power conversion circuitry 24.

Although the motor 46, reciprocating wire feed system 48, and tachometer 50 shown inside wire feeder 12 in FIG. 1, these elements may be separate components or may be components of another system. For example, the motor 46, reciprocating wire feed system 48, and tachometer 50 may be packaged inside torch 16. In some embodiments, there may be one or two reciprocating wire feeding mechanisms 48 for wire delivery. When the frictional resistance of wire to liner is high or spool inertia must be overcome, a dual feeder arrangement may be used. In such an embodiment, one motor 46 in the wire feeder 12 may be considered the "assist feeder" to push wire 42 thru conduit from the wire supply 40 to the torch 16, while another motor 46 in the torch 16 operates the reciprocating wire feed system 48 inside the torch 16. The two motors 48 may be synchronized or asynchronous where the assist feeder may be put in a constant torque mode.

Figure 2:
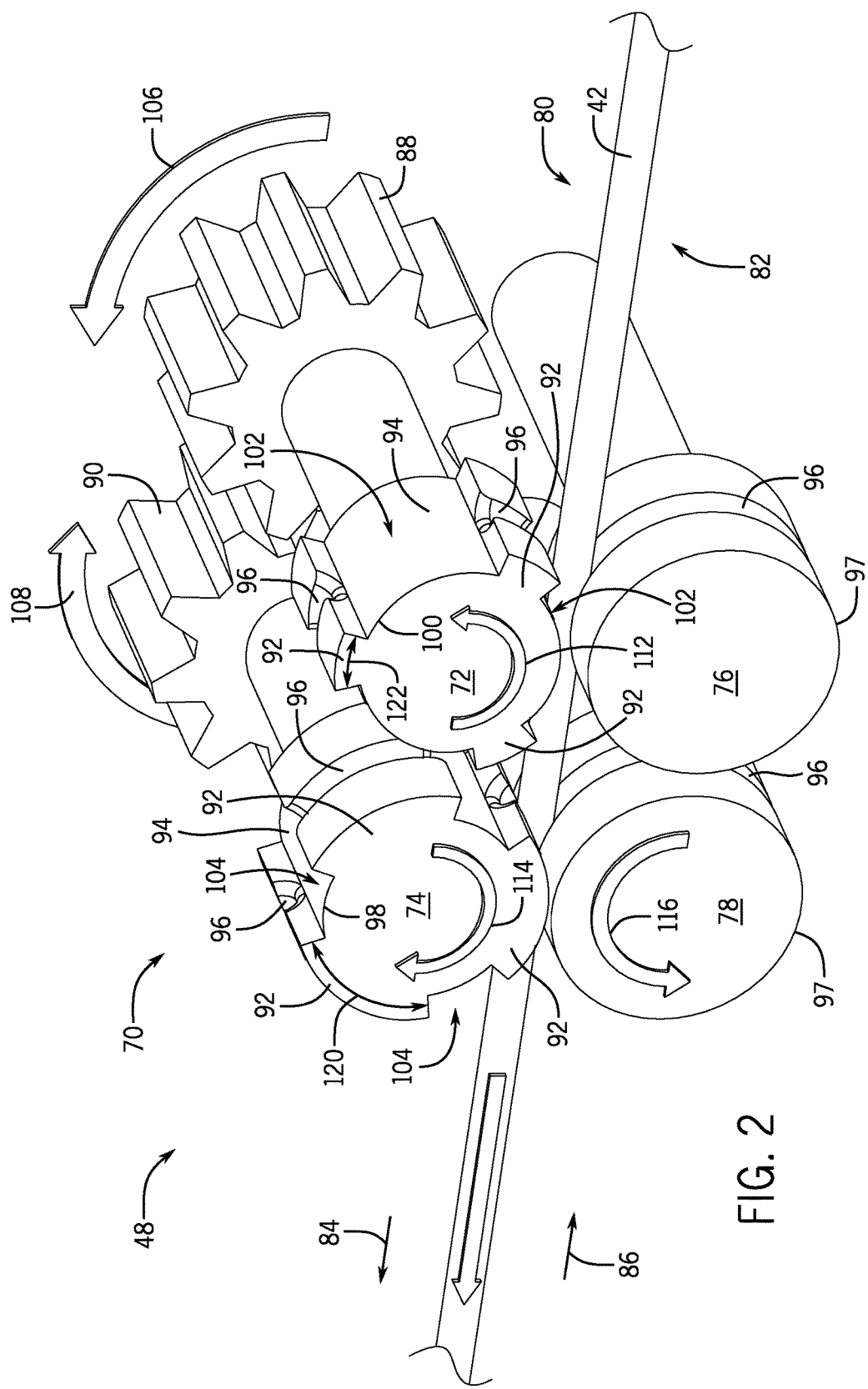
FIG. 2 is a perspective view of an embodiment of a reciprocating wire feed system having toothed drive rolls, in accordance with an embodiment of the present disclosure.
Figure 3:
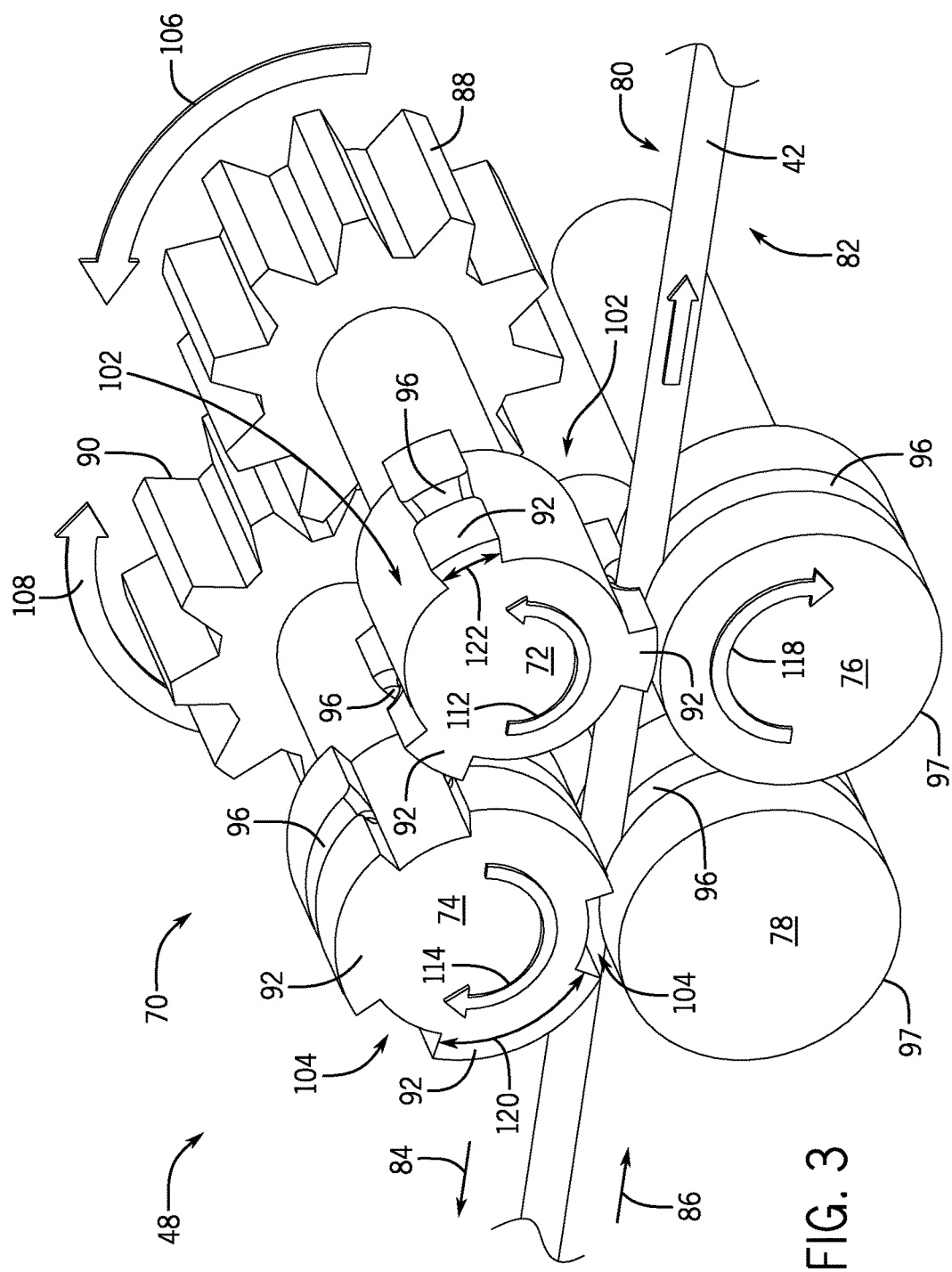
FIG. 3 is a perspective view of an embodiment of a reciprocating wire feed system having toothed drive rolls, in accordance with an embodiment of the present disclosure.

FIGS. 2 and 3 are perspective views of an embodiment of the reciprocating wire feed system 48, which may be integrated with the wire feeder 12 shown in FIG. 1. In the illustrated embodiment, the reciprocating wire feed system 48 includes a toothed drive roll system 70. For the purpose of this disclosure, a "drive roll" may be considered an actively driven roll from a wire engagement perspective, rather than from motor engagement perspective. This distinction is important because, in a conventional wire feeder, a drive roll may be actively driven from a wire engagement and a motor perspective. In the present disclosure, multiple driven rolls may engage a wire in different directions but may all be powered off the same motor shaft.

The toothed drive roll system 70 includes a first drive roll 72 and a second drive roll 74. The toothed drive roll system 70 also includes a first idler roll 76 and a second idler roll 78. As shown, the first and second drive rolls 72 and 74 are disposed adjacent to one another on a first side 80 of the wire 42, and the first and second idler rolls 76 and 78 are disposed adjacent to one another on a second side 82 of the wire 42. In other embodiments, the first and second drive rolls 72 and 74 may not be opposite the first and second idler rolls 76 and 78 relative to the wire 42. For example, the first and second drive rolls 72 and 74 and the first and second idler rolls 76 and 78 may be on the same side of the wire 42.

In the illustrated embodiment, the first drive roll 72 and the first idler roll 76 are disposed opposite one another about the wire 42, and the second drive roll 74 and the second idler roll 78 are disposed opposite one another about the wire 42. Thus, the wire 42 extends through the reciprocating wire feed system 48 between the first drive roll 72 and the first idler roll 76 and then between the second drive roll 74 and the second idler roll 78. In the manner described below, the reciprocating wire feed system 48 shown in FIGS. 2 and 3 operates to oscillate or reciprocate the welding wire 42 toward the torch 16 (e.g., in a direction 84) and away from the torch 16 (e.g., in a direction 86).

As discussed above, the motor 46 may drive the reciprocating wire feed system 48. In the illustrated embodiment, the first and second drive rolls 72 and 74 are coupled to one another via respective gears (e.g., a first gear 88 and a second gear 90). Thus, the motor 46 may be coupled to the first gear 88 or the second gear 90 and thereby drive both the first drive roll 72 and the second drive roll 74 simultaneously. The first and second idler rolls 76 and 78 may not be coupled to the motor 46, but in other embodiments, the first and second idler rolls 76 and 78 may also be driven by a motor, thereby also becoming driven rolls.

As mentioned above, the first and second drive rolls 72 and 74 are simultaneously driven by the motor 46 (i.e., via coupling of the first and second gears 88 and 90), but the first drive roll 72 and the second drive roll 74 are configured such that only one of the first and second drive rolls 72 and 74 is driving the welding wire 42 at a given time. Specifically, each of the first and second drive rolls 72 and 74 include protruding portions 92 extending from a respective base outer diameter 94 of the first and second drive rolls 72 and 74, and spanning an entire width of the respective drive roll 72, 74. Each protruding portion 92 of the first and second drive rolls 72 and 74 has a trough 96 that is formed circumferentially along the protruding portion 92 which may engage with the welding wire 42 intermittently as the first and second drive rolls 72 and 74 are driven by the motor 46. In certain embodiments, the troughs 96 may have a U-shape, a V-shape, or other suitable shape that reliably hugs and grips the wire 42 without slipping, deforming or shaving the wire 42. Additionally, in certain embodiments, the troughs 96 may have a surface treatment, such as knurling. As shown, the first and second idler rolls 76 and 78 also include troughs 96, which may extend completely around a respective circumference 97 of the first and second idler rolls 76 and 78.

In certain embodiments, the protruding portions 92 of the first drive roll 72 are spaced equidistantly about a circumference 98 of the first drive roll 72, and the protruding portions 92 of the second drive roll 74 are spaced equidistantly about a circumference 100 of the second drive roll 74. Additionally, the protruding portions 92 of the first drive roll 72 are staggered or "out of phase" relative to the protruding portions 92 of the second drive roll 74. As a result, when one of the protruding portions 92 of the second drive roll 74 is in contact with the welding wire 42, as shown in FIG. 2, no protruding portion 92 of the first drive roll 72 is in contact with the welding wire 42. Instead, when one of the protruding portions 92 of the second drive roll 74 is in contact with the welding wire 42, a recessed portion 102 between two protruding portions 92 of the first drive roll 72 is exposed to the welding wire 42 and disengage roll 72 from wire 42. Similarly, when one of the protruding portions 92 of the first drive roll 72 is in contact with the welding wire 42, as shown in FIG. 3, no protruding portion 92 of the second drive roll 74 is in contact with the welding wire 42. Instead, when one of the protruding portions 92 of the first drive roll 72 is in contact with the welding wire 42, a recessed portion 104 between two protruding portions 92 of the second drive roll 74 is exposed to the welding wire 42 and disengage roll 74 from wire 42. In this way, the first and second drive rolls 72 and 74 are configured such that only one of the drive rolls 72 and 74 is contacting the welding wire 42 at a given point in time.

As mentioned above, the first and second drive rolls 72 and 74 are coupled to one another via the first and second gears 88 and 90. More specifically, the first and second gears 88 and 90 are coupled to one another such that rotation of the first gear 88 and a direction 106 drives rotation of the second gear 90 in a direction 108, which is opposite the direction 106. Thus, as indicated by arrows 112 and 114, the first and second drive rolls 72 and 74 are driven in opposite directions in a synchronized manner.

When the one of the protrusions 92 of the second drive roll 74 engages with the welding wire 42, the reciprocating wire feed system 48 drives the welding wire 42 in the direction 84 (e.g., toward the torch 16), as shown in FIG. 2. When the second drive roll 74 is driving the welding wire 42 in the direction 84, the second idler roll 78 may also rotate (e.g., in a direction 116). As the first and second drive rolls 72 and 74 continue to rotate, the protruding portions 92 of the second drive roll 74 will lose contact with the welding wire 42, and one of the protruding portions 92 of the first drive roll 72 will make contact with the welding wire 42, as shown in FIG. 3. When one of the protruding portions 92 of the first drive roll 72, which is rotating in the direction 112 opposite the direction 114 of the second drive roll 74, makes contact with the welding wire 42 and drives the welding wire 42 in the direction 86 (e.g., away from the torch 16). When the first drive roll 72 is driving the welding wire 42 in the direction 86, the first idler roll 76 may also rotate (e.g., in a direction 118).

As the first and second drive rolls 72 and 74 continuously rotate, the respective protruding portions 92 of the first and second drive rolls 72 and 74 may make alternating contact with the welding wire 42 and drive the welding wire 42 toward and away from the welding torch 16 in the manner described above. As a result, the reciprocating wire feed system 48 creates an oscillating or reciprocating movement of the welding wire 42.

Moreover, in certain embodiments, the protruding portions 92 of the second drive roll 74 each have and arc length 120 that is greater than an arc length 122 of each of the protruding portions 92 of the first drive roll 72. As a result, the protruding portions 92 of the second drive roll 74 stay in contact with the welding wire 42 longer than the protruding portions 92 of the first drive roll 72 when the reciprocating wire feed system 48 is operating. The greater arc lengths 120 of the protruding portions 92 of the second drive roll 74 cause the reciprocating wire feed system 48 to drive the welding wire 42 farther in the direction 84 than the direction 86 when the reciprocating wire feed system 48 is operating. In other words, the greater arc lengths 120 of the protruding portions 92 of the second drive roll 74, compared to the shorter arc lengths 122 of the protruding portions 92 of the first drive roll 72 enable the reciprocating wire feed system 48 to drive the welding wire 42 in a net forward motion with reciprocating motion, figuratively speaking, "two steps toward" the torch 16 and "one step back" from the welding torch 16, as mentioned above. In certain embodiments, the arc lengths 120 may be approximately 1.1, 1.2, 1.3, 1.4, 1.5, 2, 3, 4, 5 or more times greater than the arc lengths 122. In certain embodiments, the arc lengths 120 and 122 may be sized such that no protruding portions 92 contacts the welding wire 42 for a brief moment (e.g., in between protruding portions 92 of the first drive roll 72 and second drive roll 74 contacting the welding wire 42) to enable a delay or intermittent stop of the welding wire 42 movement. Thus, in such embodiments, the sum of all arc lengths 120 and 122 of all protruding portions 92 in the reciprocating wire feed system 48 may be less than 360 degrees.

The first and second drive rolls 72 and 74 and the first and second idler rolls 76 and 78 may be formed from a variety of materials. For example, the first and second idler rolls 76 and 78 may be formed from a lightweight material, such as aluminum, titanium, a ceramic, or a polymer, to reduce inertia in the starting and stopping of the first and second idler rolls 76 and 78. As the motor 46 drives (e.g., actively or passively) the first and second drive rolls 72 and 74, the first and second drive rolls 72 and 74 may be formed from a heavier material, such as steel. However, any suitable material may be used to form the first and second drive rolls 72 and 74 and the first and second idler rolls 76 and 78. The trough surfaces may be hardened by heat treatment or carburizing to improve durability and wear resistance.

In the illustrated embodiments, the first and second drive rolls 72 and 74 having the protruding portions 92 are on the same side of the welding wire 42. However, in other embodiments, the first and second drive rolls 72 and 74 having the protruding portions 92 may be on opposite sides of the welding wire 42. For example, in one embodiment, the positions of the second drive roll 74 and the second idler roll 78 shown in FIGS. 2 and 3 may be reversed or switched. Thus, the first drive roll 72 and the second idler roll 78 may be adjacent to one another. In such an embodiment, the first and second drive rolls 72 and 74 may still be geared to one another, or the first and second drive rolls 72 and 74 may be driven separately (e.g., by separate motors). In such an embodiment, the first and second drive rolls 72 and 74 may rotate in the same direction instead of in directions opposite one another. In other embodiments, the reciprocating wire feed system 48 may have other configurations. For example, in another embodiment, the first and second idler rolls 76 and 78 may also be driven by a motor, such that the first and second idler rolls 76 and 78 are drive rolls (e.g., third and fourth drive rolls). In such an embodiment, the first and second idler rolls 76 and 78 may be geared to the first and/or second drive rolls 72 and/or 74, or the first and second idler rolls 76 and 78 may be driven by one or more separate motors. Further, in such an embodiment, the first and second idler rolls 76 and 78 may also include protrusions 92.

Figure 4:
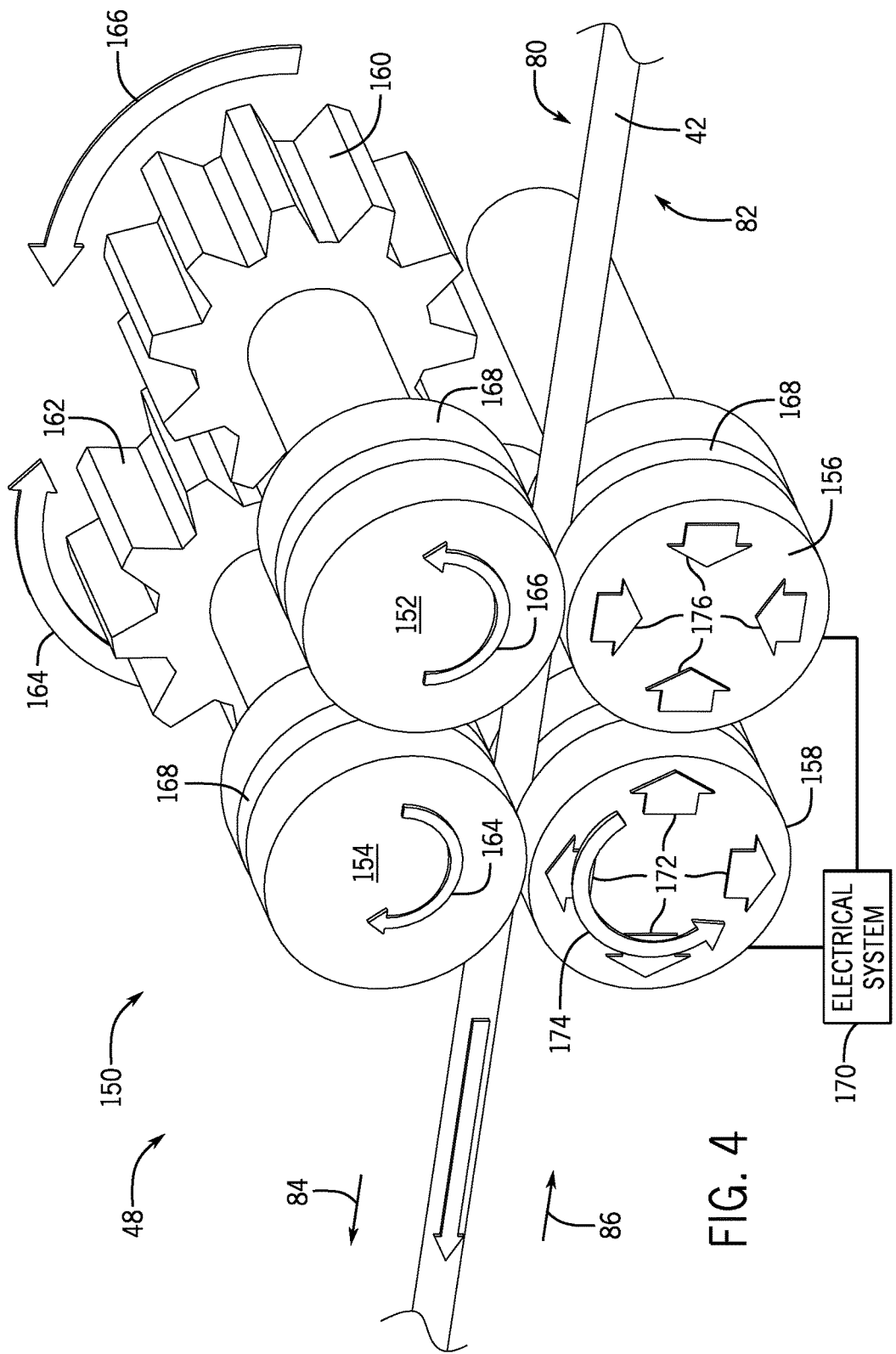
FIG. 4 is a perspective view of an embodiment of a reciprocating wire feed system having expandable drive rolls, in accordance with an embodiment of the present disclosure.
Figure 5:
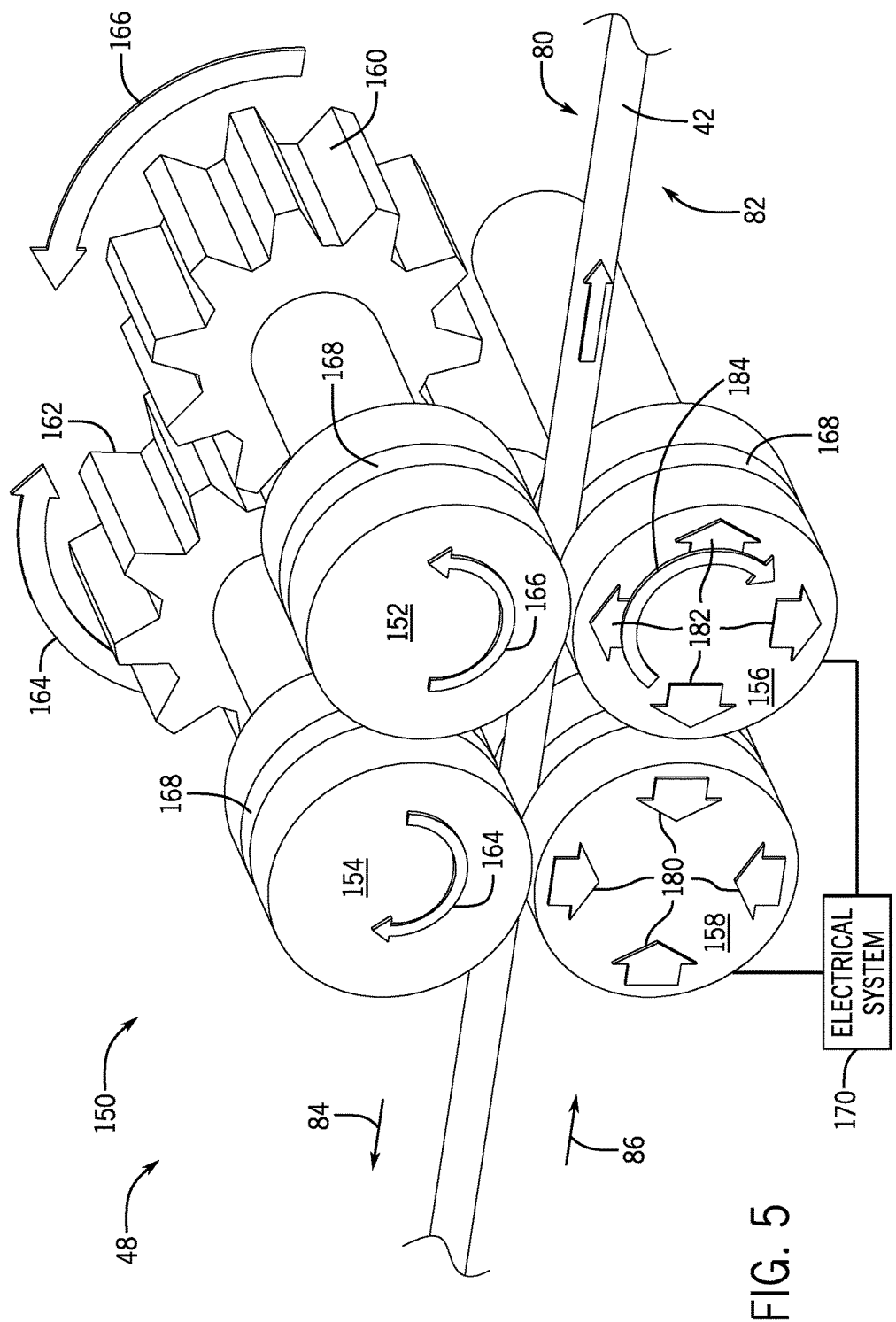
FIG. 5 is a perspective view of an embodiment of a reciprocating wire feed system having expandable drive rolls, in accordance with an embodiment of the present disclosure.

FIGS. 4 and 5 are perspective views of another embodiments of the reciprocating wire feed system 48, which may be integrated with the wire feeder 12 shown in FIG. 1. In the illustrated embodiment, the reciprocating wire feed system 48 includes an expandable drive roll system 150. The expandable drive roll system 150 includes a first drive roll 152 and a second drive roll 154. The expandable drive roll system 150 also includes a first expandable roll 156 and a second expandable roll 158. As shown, the first and second drive rolls 152 and 154 are disposed adjacent to one another on the first side 80 of the wire 42, and the first and second expandable rolls 156 and 158 are disposed adjacent to one another on the second side 82 of the wire 42. Additionally, the first drive roll 152 and the first expandable roll 156 are disposed opposite one another about the wire 42, and the second drive roll 154 and the second expandable roll 158 are disposed opposite one another about the wire 42. Thus, the wire 42 extends through the reciprocating wire feed system 48 between the first drive roll 152 and the first expandable roll 156 and then between the second drive roll 154 and the second expandable roll 158. In the manner described below, the reciprocating wire feed system 48 shown in FIGS. 4 and 5 operates to oscillate or reciprocate the welding wire 42 toward the torch 16 (e.g., in the direction 84) and away from the torch 16 (e.g., in the direction 86).

As discussed above, the motor 46 may drive the reciprocating wire feed system 48. In the illustrated embodiment, the first and second drive rolls 152 and 154 are coupled to one another via respective gears (e.g., a first gear 160 and a second gear 162). Thus, the motor 46 may be coupled to the first gear 160 or the second gear 162 and thereby drive both the first drive roll 152 and the second drive roll 154 simultaneously. As similarly described above with reference to FIGS. 2 and 3, the first and second drive rolls 152 and 154 are geared to one another such that the first and second drive rolls 152 and 154 are driven to rotate in opposite directions, as indicated by arrows 164 and 166.

As mentioned above, the welding wire 42 extends between the first drive roll 152 and the first expandable roll 156, and the welding wire 42 also extends between the second drive roll 154 and the second expandable roll 158. As shown in FIGS. 4 and 5, each of the rolls 152, 154, 156, 158 includes a trough (e.g., a circumferential trough) 168 through which the welding wire 42 may pass as the welding wire 42 travels through the reciprocating wire feed system 48. The troughs 168 may be similar to the troughs 96 discussed with reference to FIGS. 2 and 3.

In operation, the welding wire 42 may be engaged with either the first drive roll 152 and the first expandable roll 156 or the second drive roll 154 and the second expandable roll 158 at a given time. To enable this operation, the first and second expandable rolls 156 and 158 are formed at least partially from a piezoelectric crystal, a piezo-ceramic, a PZT (e.g., lead zirconate titanate), or other material that may expand and contract with electrical stimulation. For example, in FIG. 4, an electrical system (e.g., drive circuit or control system) 170 of the reciprocating wire feed system 48, controlled by control circuitry 32 of FIG. 1, applies an electrical signal (e.g. drive potential) to the second expandable roll 158. As a result, the second expandable roll 158 radially expands, as indicated by arrows 172, to engage the welding wire 42 in conjunction with the second drive roll 154. The respective troughs 168 of the second drive roll 154 and second expandable roll 158 capture the welding wire 42. As the second drive roll 154 is rotated in the direction 164, the welding wire 42 captured by the second drive roll 154 and the second expandable roll 158 drive the welding wire 42 in the direction 84 (e.g., toward the torch 16). At the same time, the second expandable roll 158, which is not driven by the motor 46 or the gears 160 and 162, rotates in a direction 174 due to the friction created between the second drive roll 154, the welding wire 42, and the second expandable roll 158.

When then second expandable roll 158 is actuated with an electrical signal by the electrical system 170, the electrical system 170 may not apply an electrical signal to the first expandable roll 156 (enabling relaxation or contraction of the first expandable roll 156) or apply an intermittent or continuous signal of opposite polarity to cause a faster contraction of the first expandable roll 156. As a result, the first expandable roll 156 may be in a contracted (e.g., radially contracted) state, as indicated by arrows 176 in FIG. 4. Thus, the welding wire 42 is not engaged by the first driver roll 152 and the first expandable roll 156.

To create the reciprocating or oscillating motion in the welding wire 42, the electrical system 170 may suspend the application of an electrical signal to the second expandable roll 158 and begin application of an electrical signal (e.g., control signal) to the first expandable roll 156. As a result, the second expandable roll 158 may radially contract or relax, as indicated by arrows 180 in FIG. 5, and the first expandable roll 156 may radially expand, as indicated by arrows 182 in FIG. 5. In this way, the respective troughs 168 of the first drive roll 152 and the first expandable roll 156 capture the welding wire 42. As the first drive roll 152 is rotated in the direction 166, the welding wire 42 captured by the first drive roll 152 and the first expandable roll 156 drive the welding wire 42 in the direction 86 (e.g., away from the torch 16). At the same time, the first expandable roll 156, which is not driven by the motor 46 or the gears 160 and 162, rotates in a direction 184 due to the friction created between the first drive roll 152, the welding wire 42, and the first expandable roll 156.

As with the embodiment of the reciprocating wire feed system 48 described above with reference to FIGS. 2 and 3, the embodiment of the reciprocating wire feed system 48 shown in FIGS. 4 and 5 may be configured to reciprocate the welding wire 42 with net forward motion, figuratively, "two steps forward, one step back." To this end, the electrical system 170 may be configured to apply electrical signals to the first and second expandable rolls 156 and 158 for different lengths of time or even a different polarity. For example, the electrical system 170 may apply an electrical signal to the first expandable roll 156 for a first length of time (i.e., to force the welding wire 42 in the direction 86 away from the torch 16), and the electrical system 170 may subsequently apply an electrical signal (e.g., control signal) to the second expandable roll 158 for a second length of time that is twice as long as the first length of time (i.e., to force the welding wire 42 in the direction 84 toward the torch 16). This control scheme may be repeated to move the welding wire 42 towards the torch in a reciprocating or oscillating fashion. In certain embodiments, the electrical system 170 may pause or delay between sending electrical signals to the first and second expandable rolls 156 and 158 to effectuate a "stop" in the travel of the welding wire 42. In other words, when no electrical signal is applied to the first or second expandable rolls 156 and 158, both expandable rolls 156 and 158 may be in a radially contracted or relaxed state, and thus the welding wire 42 may not be captured or engaged with the first drive roll 152 and the first expandable roll 156 or the second drive roll 154 and the second expandable roll 158.

As mentioned above, the first and second expandable rolls 156 and 158 are formed from a piezoelectric crystal material, a piezo-ceramic material, a PZT, or other material that enables expansion and contraction of the first and second expandable rolls 156 and 158 upon application of an electrical signal. In some embodiments, the entire structures of the first and second expandable rolls 156 and 158 are formed from the expandable material. However, in other embodiments, only a portion (e.g., a central disk portion including the trough 168) of the first and second expandable rolls 156 and 158 is formed from the expandable material.

Figure 6A:
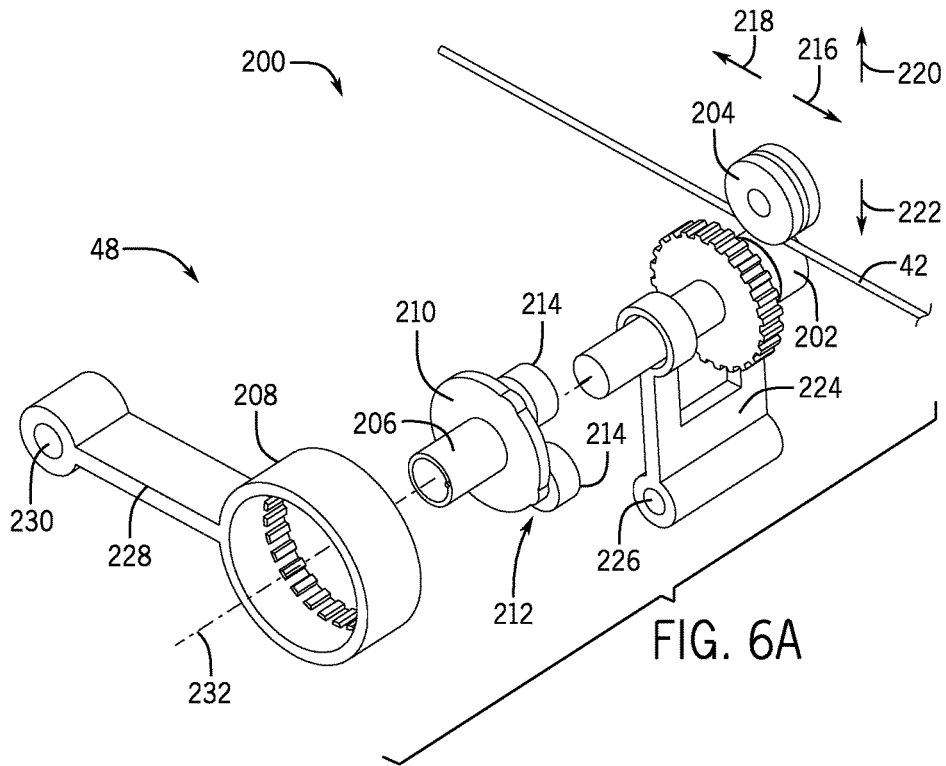
FIG. 6A is an exploded perspective view of an embodiment of a reciprocating wire feed system having a planetary gear system, in accordance with an embodiment of the present disclosure.
Figure 6B:
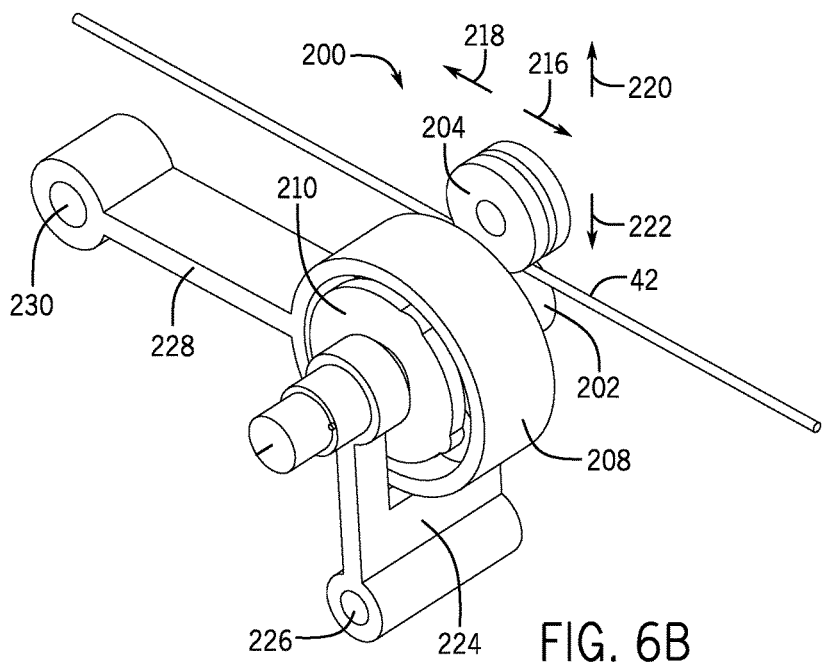
FIG. 6B is an assembled perspective view of an embodiment of a reciprocating wire feed system having a planetary gear system, in accordance with an embodiment of the present disclosure.

FIG. 6A is an exploded perspective view of another embodiment of the reciprocating wire feed system 48, illustrating a planetary gear system 200, and FIG. 6B is an assembled perspective view of the reciprocating wire feed system 48, illustrating the planetary gear system 200. In the illustrated embodiment, the planetary gear system 200 includes a drive roll 202 and a pressure roll 204 (or an idler roll), which capture the welding wire 42. The drive roll 202 is driven by the motor 46, which may be coupled to the drive roll 202 via a shaft 206.

The planetary gear system 200 also includes a ring gear 208 and an enlarged planet gear 210 that fits within the ring gear 208. A centering roller assembly 212 having rollers 214 is also disposed within the ring gear 208 that enable and ensure engagement between the planet gear 210 and the ring gear 208. As will be appreciated, the planet gear 210 orbits within the ring gear 208 as the planet gear 210 is driven by the motor 46 and the shaft 206. As the planet gear 210 is rotated within the ring gear 208, the planet gear 210, and thus the drive roll 202, shifts left and right (e.g., in directions 216 and 218). However, the planet gear 210 and the drive roll 202 do not shift up and down (e.g., in directions 220 and 222) because the shaft 206, the planet gear 210, and the drive roll 202 are restrained from moving in the directions 220 and 222 by a shaft restraint 224 (e.g., vertical restraint), which may be pinned to a fixed structure at a joint 226 of the shaft restraint 224. However, the joint 226 is a pivotable joint that enables pivoting of the shaft restraint 224 in the directions 216 and 218.

As the planet gear 210 orbits within the ring gear 208, the ring gear may move up and down in the directions 220 and 222, but horizontal or left and right movement (e.g., in directions 216 and 218) of the ring gear 208 is restricted by a ring gear restraint 228 (e.g., horizontal restraint). As with the shaft restraint 224, the ring gear restraint 228 may be pivotably coupled to another structure of the reciprocating wire feed system 48 at a joint 230.

As will be appreciated, the net motion of the welding wire 42 is a sum of the steady angular motion of the drive roll 202 and a cyclic lead or lag caused by the motion of a drive roll axis 232 in the directions 218 and 216. The left and right motion of the drive roll 202 is transferred to the welding wire 42 due to the frictional engagement between the drive roll 202, the pressure roll 204, and the welding wire 42. Indeed, the planetary gear system 200 enables left and right (e.g., directions 216 and 218) movement of the drive roll 202 (and thus the wire 42) with a unidirectional rotational input from the motor 26. Thus, the welding wire 42 may be reciprocated or oscillated toward the welding torch 16 without the use of a bi-directional motor.

Figure 7:
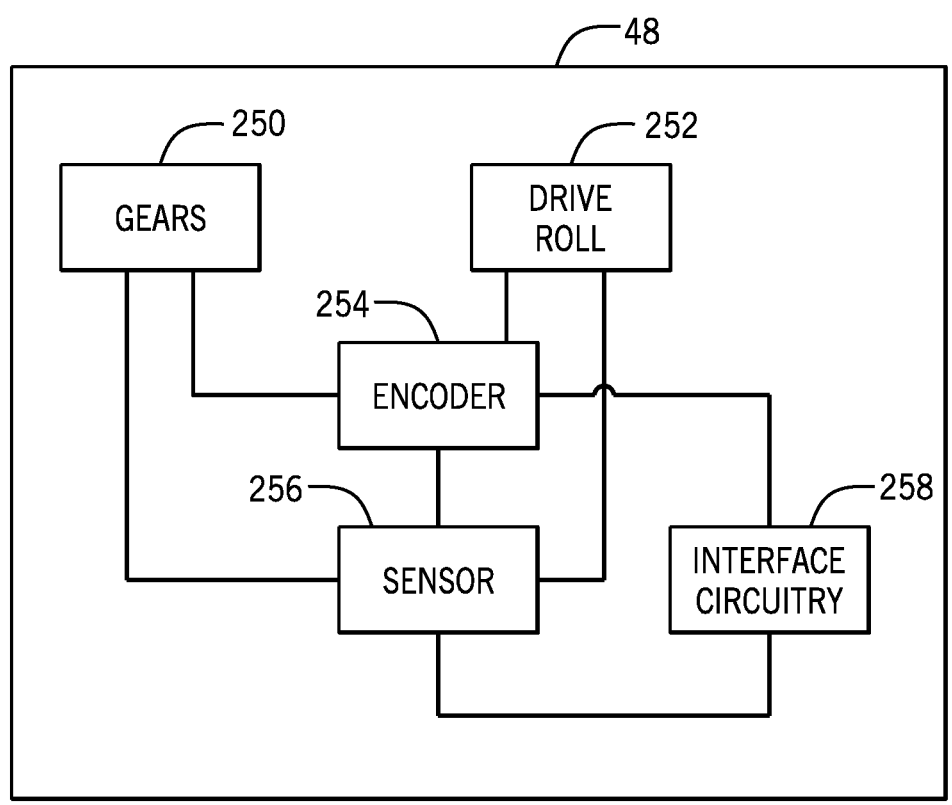
FIG. 7 is a schematic of an embodiment of a reciprocating wire feed system having a sensor system, in accordance with an embodiment of the present disclosure.

FIG. 7 is a schematic of the reciprocating wire feed system 48, illustrating various components of the reciprocating wire feed system 48 that may be included with any of the embodiments discussed above. In the illustrated embodiment, the reciprocating wire feed system 48 includes gears 250, a drive roll 252, an encoder 254, a sensor 256, and interface circuitry 258. The gears 250 may be any of the gears discussed above, such as gears 88, 90, 160, 162, 210, and so forth. Similarly, the drive roll 252 may be any of the drive rolls discussed above. The encoder 254 is configured to monitor a rotation of the gears 250 and or the drive roll 252. Similarly, the sensor 256 may be a position sensor, rotational sensor, or any other sensor configured to detect motion or a position of one of the components of the reciprocating wire feed system 48, such as the gears 250 or the drive roll 252. Based on the parameters detected by the encoder 254 and/or the sensor 256, speed, and/or acceleration, and/or movement, and/or direction of the welding wire 42 may be calculated and monitored. Based on the detected movement, motion, or direction the welding wire 42, a desired current may be supplied to the torch 16 by the power supply 10. For example, the interface circuitry 258 may be configured to communicate with the interface circuitry 28 of the power supply 10 to enable proper adjustment of the current supplied to the torch 16. The adjustment may be made using feedback or feedforward controller. The movement of the welding wire 42 and the current output of the power supply 10 may be synchronized to optimize arc formation, reduce spatter, improved deposition, travel speed, reduced heat input and distortion, calm down or agitate weld puddle and oscillation, or otherwise improve the welding process.

Figure 8:
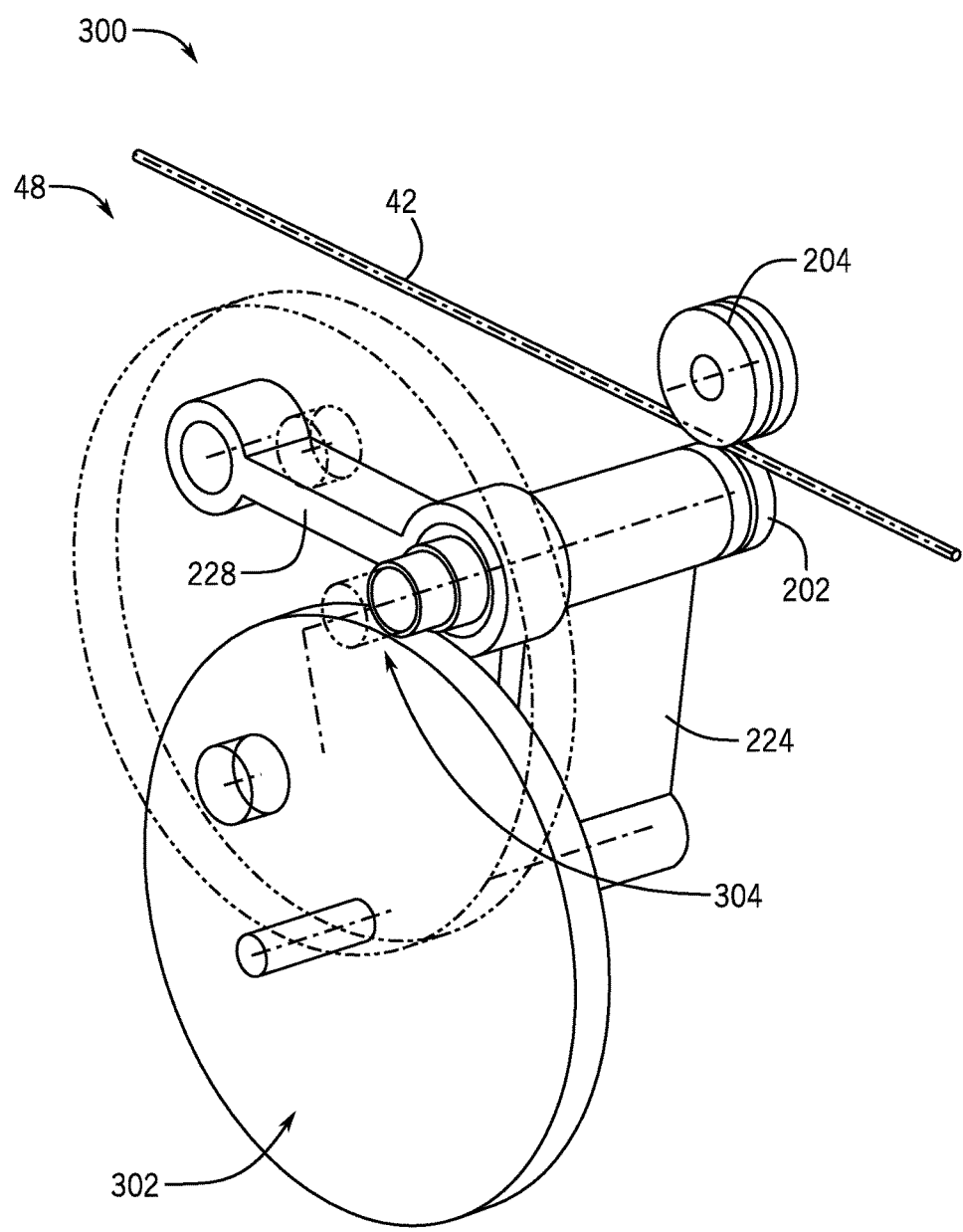
FIG. 8 is an assembled perspective view of an embodiment of a reciprocating wire feed system having a planetary gear system, in accordance with an embodiment of the present disclosure.

FIG. 8 is an assembled perspective view of the reciprocating wire feed system 48, illustrating another embodiment of a planetary gear system 300. The illustrated embodiment may be capable of higher frequency oscillations due to a high gear ratio of the system 48. In operation, an input shaft, pinion, and gear mechanism 302 rotate continuously in one direction to drive the welding wire 42 in a forward and backward motion, with a net forward motion. In certain embodiments, the input shaft, pinion, and gear mechanism 302 may be geared and/or synchronized with an eccentric mechanism 304. In other words, one or more of the input shaft, pinion, and gear mechanism 302, eccentric mechanism 304, or other component of the planetary gear system 300 may include gear teeth to synchronize movement of the different components of the planetary gear system 300. For example, the input shaft and/or the gear may rotated continuously in a single direction, and rotation of the input shaft and/or the gear may be translated into forward and backyard motion, with a net forward motion, of the welding wire 42 via the eccentric mechanism, the vertical restraint 224, and the horizontal restraint 228.

As mentioned above, present embodiments may be used with 100% $CO_2$ gas welding with EN, EP, AC, and with solid and tubular wires. The embodiments described above enable rapid wire reversals at a rate higher than 100 Hz, e.g. at 150-250 Hz, to transfer liquid metal at the end of filler wire in a controlled manner so that the welding current during short entry and short exit are minimized.

While only certain features of the present disclosure have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A reciprocating welding wire feed system, comprising:
a first drive roll comprising a first set of protrusions extending radially outward from the first drive roll and configured to drive a welding wire in a linear first direction; and
a second drive roll disposed adjacent to the first drive roll, wherein the second drive roll comprises a second set of protrusions extending radially outward from the second drive roll and configured to drive the welding wire in a linear second direction opposite the first linear direction;
wherein the first drive roll and the second drive rolls do not contact the welding wire simultaneously, and
wherein the first set of protrusions is spaced equidistantly about a first circumference of the first drive roll, the second set of protrusions is spaced equidistantly about a second circumference of the second drive roll, and the first and second sets of protrusions are out of phase relative to one another.

2. The system of claim 1, wherein the first set of protrusions and the second set of protrusions are configured to alternatingly contact the welding wire at different times during operation of the reciprocating welding wire feed system.

3. The system of claim 1, wherein each protrusion of the first set of protrusions has a first arc length about a first circumference of the first drive roll, each protrusion of the second set of protrusions has a second arc length about a second circumference of the second drive roll, and the first arc length is greater than the second arc length.

4. The system of claim 1, wherein the first drive roll is fixed to a first gear, the second drive roll is fixed to a second gear, and the first and second gears are synchronized with one another.

5. The system of claim 4, comprising a motor coupled to the first gear or the second gear and configured to drive the first gear or the second gear, wherein the motor, when in operation, rotates in only one direction.

6. The system of claim 1, wherein each protrusion of the first set of protrusions comprises a respective trough that extends circumferentially through the respective protrusion and that is configured to engage with the welding wire, and each protrusion of the second set of protrusions comprises a respective trough that extends circumferentially through the respective protrusion and that is configured to engage with the welding wire.

7. The system of claim 1, comprising a first idler roller disposed opposite the first drive roll relative to the welding wire, and a second idler roller disposed opposite the second drive roll relative to the welding wire, wherein the first set of protrusions and the first idler roller are configured to intermittently capture and drive the welding wire in the first linear direction, and the second set of protrusions and the second idler roller are configured to intermittently capture and drive the welding wire in the second linear direction.

8. The system of claim 1, comprising a third drive roll disposed opposite the first drive roll relative to the welding wire, and a fourth drive roll disposed opposite the second drive roll relative to the welding wire, wherein the first set of protrusions and the third drive roll are configured to intermittently capture and drive the welding wire in the first linear direction, and the second set of protrusions and the fourth drive roll are configured to intermittently capture and drive the welding wire in the second linear direction.

9. The system of claim 1, wherein the system is configured to perform a gas metal arc welding, flux-cored arc welding, submerged arc welding, hot wire/cold wire tungsten inert gas welding, laser welding, plasma welding, cladding, brazing process, a multi-wire process, or any combination thereof.

10. A reciprocating welding wire feed system, comprising:
a first drive roll comprising a first set of protrusions extending radially outward from the first drive roll and configured to drive a welding wire in a linear first direction; and
a second drive roll disposed adjacent to the first drive roll, wherein the second drive roll comprises a second set of protrusions extending radially outward from the second drive roll and configured to drive the welding wire in a linear second direction opposite the first linear direction;
wherein the first drive roll and the second drive rolls do not contact the welding wire simultaneously, and
wherein each protrusion of the first set of protrusions has a first arc length about a first circumference of the first drive roll, each protrusion of the second set of protrusions has a second arc length about a second circumference of the second drive roll, and the first arc length is greater than the second arc length.

11. The system of claim 10, wherein the first set of protrusions and the second set of protrusions are configured to alternatingly contact the welding wire at different times during operation of the reciprocating welding wire feed system.

12. The system of claim 10, wherein the first drive roll is fixed to a first gear, the second drive roll is fixed to a second gear, and the first and second gears are synchronized with one another.

13. The system of claim 12, comprising a motor coupled to the first gear or the second gear and configured to drive the first gear or the second gear, wherein the motor, when in operation, rotates in only one direction.

14. The system of claim 10, wherein each protrusion of the first set of protrusions comprises a respective trough that extends circumferentially through the respective protrusion and that is configured to engage with the welding wire, and each protrusion of the second set of protrusions comprises a respective trough that extends circumferentially through the respective protrusion and that is configured to engage with the welding wire.

15. The system of claim 10, comprising a first idler roller disposed opposite the first drive roll relative to the welding wire, and a second idler roller disposed opposite the second drive roll relative to the welding wire, wherein the first set of protrusions and the first idler roller are configured to intermittently capture and drive the welding wire in the first linear direction, and the second set of protrusions and the second idler roller are configured to intermittently capture and drive the welding wire in the second linear direction.

16. The system of claim 10, comprising a third drive roll disposed opposite the first drive roll relative to the welding wire, and a fourth drive roll disposed opposite the second drive roll relative to the welding wire, wherein the first set of protrusions and the third drive roll are configured to intermittently capture and drive the welding wire in the first linear direction, and the second set of protrusions and the fourth drive roll are configured to intermittently capture and drive the welding wire in the second linear direction.

17. The system of claim 10, wherein the system is configured to perform a gas metal arc welding, flux-cored arc welding, submerged arc welding, hot wire/cold wire tungsten inert gas welding, laser welding, plasma welding, cladding, brazing process, a multi-wire process, or any combination thereof.

18. A reciprocating welding wire feed system, comprising:
a first drive roll comprising a first set of protrusions extending radially outward from the first drive roll and configured to drive a welding wire in a linear first direction; and
a second drive roll disposed adjacent to the first drive roll, wherein the second drive roll comprises a second set of protrusions extending radially outward from the second drive roll and configured to drive the welding wire in a linear second direction opposite the first linear direction;
wherein the first drive roll and the second drive rolls do not contact the welding wire simultaneously, and
wherein each protrusion of the first set of protrusions comprises a respective trough that extends circumferentially through the respective protrusion and that is configured to engage with the welding wire, and each protrusion of the second set of protrusions comprises a respective trough that extends circumferentially through the respective protrusion and that is configured to engage with the welding wire.

19. The system of claim 18, wherein the first set of protrusions and the second set of protrusions are configured to alternatingly contact the welding wire at different times during operation of the reciprocating welding wire feed system.

20. The system of claim 18, wherein the first drive roll is fixed to a first gear, the second drive roll is fixed to a second gear, and the first and second gears are synchronized with one another.

21. The system of claim 20, comprising a motor coupled to the first gear or the second gear and configured to drive the first gear or the second gear, wherein the motor, when in operation, rotates in only one direction.

22. The system of claim 18, comprising a first idler roller disposed opposite the first drive roll relative to the welding wire, and a second idler roller disposed opposite the second drive roll relative to the welding wire, wherein the first set of protrusions and the first idler roller are configured to intermittently capture and drive the welding wire in the first linear direction, and the second set of protrusions and the second idler roller are configured to intermittently capture and drive the welding wire in the second linear direction.

23. The system of claim 18, comprising a third drive roll disposed opposite the first drive roll relative to the welding wire, and a fourth drive roll disposed opposite the second drive roll relative to the welding wire, wherein the first set of protrusions and the third drive roll are configured to intermittently capture and drive the welding wire in the first linear direction, and the second set of protrusions and the fourth drive roll are configured to intermittently capture and drive the welding wire in the second linear direction.

24. The system of claim 18, wherein the system is configured to perform a gas metal arc welding, flux-cored arc welding, submerged arc welding, hot wire/cold wire tungsten inert gas welding, laser welding, plasma welding, cladding, brazing process, a multi-wire process, or any combination thereof.

25. A reciprocating welding wire feed system, comprising:
a first drive roll comprising a first set of protrusions extending radially outward from the first drive roll and configured to drive a welding wire in a linear first direction; and
a second drive roll disposed adjacent to the first drive roll, wherein the second drive roll comprises a second set of protrusions extending radially outward from the second drive roll and configured to drive the welding wire in a linear second direction opposite the first linear direction, wherein:
the first drive roll and the second drive rolls do not contact the welding wire simultaneously, and
the first drive roll is fixed to a first gear, the second drive roll is fixed to a second gear, and the first and second gears are synchronized with one another; and
a motor coupled to the first gear or the second gear and configured to drive the first gear or the second gear, wherein the motor, when in operation, rotates in only one direction.

26. The system of claim 25, wherein the first set of protrusions and the second set of protrusions are configured to alternatingly contact the welding wire at different times during operation of the reciprocating welding wire feed system.

27. The system of claim 25, comprising a first idler roller disposed opposite the first drive roll relative to the welding wire, and a second idler roller disposed opposite the second drive roll relative to the welding wire, wherein the first set of protrusions and the first idler roller are configured to intermittently capture and drive the welding wire in the first linear direction, and the second set of protrusions and the second idler roller are configured to intermittently capture and drive the welding wire in the second linear direction.

28. The system of claim 25, comprising a third drive roll disposed opposite the first drive roll relative to the welding wire, and a fourth drive roll disposed opposite the second drive roll relative to the welding wire, wherein the first set of protrusions and the third drive roll are configured to intermittently capture and drive the welding wire in the first linear direction, and the second set of protrusions and the fourth drive roll are configured to intermittently capture and drive the welding wire in the second linear direction.

29. The system of claim 25, wherein the system is configured to perform a gas metal arc welding, flux-cored arc welding, submerged arc welding, hot wire/cold wire tungsten inert gas welding, laser welding, plasma welding, cladding, brazing process, a multi-wire process, or any combination thereof.

* * * * *